(12) United States Patent
Ravi

(10) Patent No.: US 11,258,767 B2
(45) Date of Patent: Feb. 22, 2022

(54) SYSTEMS AND METHODS FOR USING PUSH NOTIFICATIONS TO ESTABLISH PROXIED COMMUNICATIONS AND FOR SECURITY POLICY ENFORCEMENT

(71) Applicant: Versa Networks, Inc., San Jose, CA (US)

(72) Inventor: Sunil Ravi, Pleasanton, CA (US)

(73) Assignee: Versa Networks, Inc., San Jose, CA (US)

(*) Notice: Subject to any disclaimer, the term of this patent is extended or adjusted under 35 U.S.C. 154(b) by 107 days.

(21) Appl. No.: 16/821,932

(22) Filed: Mar. 17, 2020

(65) Prior Publication Data
US 2021/0297390 A1 Sep. 23, 2021

(51) Int. Cl.
*H04L 29/06* (2006.01)
*H04L 9/08* (2006.01)
*H04L 12/66* (2006.01)
*H04L 67/02* (2022.01)
*H04L 67/56* (2022.01)
*H04L 67/55* (2022.01)

(52) U.S. Cl.
CPC ........ *H04L 63/0281* (2013.01); *H04L 9/0825* (2013.01); *H04L 9/0894* (2013.01); *H04L 12/66* (2013.01); *H04L 63/08* (2013.01); *H04L 63/10* (2013.01); *H04L 63/20* (2013.01); *H04L 67/02* (2013.01); *H04L 67/26* (2013.01); *H04L 67/28* (2013.01)

(58) Field of Classification Search
CPC ..... H04L 63/0281; H04L 63/10; H04L 63/20; H04L 67/26; H04L 67/28
See application file for complete search history.

(56) References Cited

U.S. PATENT DOCUMENTS

| | | | |
|---|---|---|---|
| 9,590,979 B2 * | 3/2017 | Jahr | H04L 63/083 |
| 2016/0301667 A1 * | 10/2016 | Hyun | H04L 63/0272 |
| 2020/0028860 A1 * | 1/2020 | Touboul | G06F 21/562 |

OTHER PUBLICATIONS

W3C, "Push API" retrieved from the internet on Jan. 20, 2020: http://www.w3.org/TR/push-api/, 24 pages (Oct. 3, 2019).
Thomson, M. et al. "Generic Event Delivery Using HTTP Push", Internet Engieering Task Force (IETF), 31 pages (Dec. 2016).
Thomson, M. et al. "Voluntary Application Server Identification (VAPID) for Web Push", Internet Engieering Task Force (IETF), 14 pages (Nov. 2017).

* cited by examiner

*Primary Examiner* — Esther B. Henderson
(74) *Attorney, Agent, or Firm* — Loza & Loza, LLP

(57) ABSTRACT

An advancement over previous techniques uses push notifications to provide users with proxied communications to outside devices reachable using a security appliance or network gateway. Encrypted direct communication between a user device with the outside device is blocked and the user device is provided with a proxy URL at which indirect proxied communications can be provided. A proxy at the proxy URL can read the communications between the user device and the outside device. The proxy can thereby apply security policies to the indirect proxied communications. The security appliance can provide the proxy URL to the user device via a push server.

20 Claims, 13 Drawing Sheets

Push Request 1001

Policy Information Describing the Blocking of the Communication (Can be Encrypted using Auth or User Public Key) 1002

Proxy URL 1003

Authentication Data (Generated at least in part using Server Private Key) 1004

SYSTEMS AND METHODS FOR USING PUSH NOTIFICATIONS TO ESTABLISH PROXIED COMMUNICATIONS AND FOR SECURITY POLICY ENFORCEMENT

TECHNICAL FIELD

The embodiments herein relate to computer networks, computer security, network gateways, network security appliances, push notifications, push servers, and, more particularly, to providing push notifications to user devices to thereby provide proxy URLs for indirect proxied communications between user devices and outside devices.

BACKGROUND

A computer network is a digital telecommunications network which allows computing devices to exchange information and share resources. Computer networks support an enormous number of applications and services such as access to the World Wide Web, e-commerce, digital video, digital audio, shared use of application and storage servers, printers, fax machines, use of e-mail and instant messaging applications as well as many others. The best-known computer network is the Internet.

Network security comprises of the policies and practices adopted to prevent and monitor unauthorized access, misuse, modification, or denial of service of a computer network and network-accessible resources. Network security covers a wide variety of computer networks, both public and private, that are used in everyday jobs; conducting transactions and communications among businesses, government agencies and individuals.

A network security policy is a generic document that outlines the rules for computer network access, determines how policies are enforced and lays out some of the basic architecture of the computer network security environment. The network security policy is meant to govern data access, web browsing habits, use of passwords and encryption, email attachments, provide visibility and control, prevent threats, and many more objectives.

BRIEF SUMMARY

It is an aspect of the embodiments that a security appliance or network gateway can provide network gateway services to a user device. The terms security appliance and network gateway are used interchangeably here because the network gateway is also acting as a security appliance. Network gateway services refers to the forwarding of communications from a user device on a first network, through the network gateway, and to outside devices on another network. Network gateway services also refers to forwarding communications from the outside devices, through the network gateway, and to the user device. The user device can be on an inside network such as a company's private network. The other network can be the Internet or some other network. The network gateway acts as a security appliance by storing and enforcing a plurality of security policies. Before forwarding communications from or to any user device, the network appliance can apply the security policies to those communications. The security policies can indicate that a communication is to be allowed, blocked, rerouted, logged, etc.

It is another aspect of the embodiments to detect an encrypted direct communication attempt between the user device and an outside device. Detecting the encrypted direct communication attempt can be performed by a network gateway providing network gateway services. Having detected the encrypted direct user communication, the network appliance can react by, in compliance with the security policies, blocking the encrypted direct user communication. It may not be necessary to block all communications between the user device and the outside device. Communications can proceed through a proxy or other device providing indirect proxied communications between the user device and the outside device. The user device can communicate with the proxy and the proxy can communicate with the outside device. Communications between the user device and the proxy can be encrypted. Communications between the proxy and the outside device can be encrypted. The proxy, however, has access to the communications in unencrypted form. Unencrypted form means either decrypted or not encrypted. Encrypted proxy communications are the proxy's encrypted communications with the outside device. The proxy can read and analyze the communications between the user device and the outside device. Having unencrypted access to the indirect proxied communications the proxy can enforce the security policies based on the unencrypted content of the communications. Enforcing the security policies can involve allowing or blocking all, some, or none of the communications.

Providing a server public key to the user device and receiving push subscription data from the user device can be further aspects of the embodiments. A server key pair comprises the server public key and a server private key. The user device can be provided with the server public key. The user device can send a push subscription request to a push service, wherein the push subscription request comprises the server public key. The push service can respond to the push subscription request by providing an endpoint URL (uniform resource locator) to the user device. The user device can then provide the subscription data, wherein the push subscription data comprises the endpoint URL. Sending a message to the endpoint URL can result in the push server sending a push message to the user device. A push server at the endpoint URL can be configured to send the push message to the user device in response to receiving the message. The push message can comprise a proxy URL at which the user device can access the proxy.

After blocking an encrypted direct communication between the user device and the outside device, a network gateway can provide the proxy URL to the user device via push messaging. The network gateway can send a message comprising the proxy URL to the endpoint URL. A push server at the endpoint URL can then send a push message comprising the proxy URL to the user device. The user device can then use the proxy URL to access a proxy that provides indirect proxied communications between the user device and the outside device. The proxy can enforce the security policies on the indirect proxied communications because the proxy has unencrypted access to the indirect proxied communications.

Providing a captive portal web page to the user device can be another aspect of the embodiments. The captive portal web page, comprising the server public key, can be provided to the user device before providing the proxy URL to the user device.

It is still another aspect that the embodiments can provide security by blocking all communications through a network gateway by the user device until after receiving the push subscription data. Alternatively, all communications through the network gateway by the user device can be blocked, excepting push service communications, until after receiving the push subscription data. For example, after receiving the push message from the push server, a security appliance processes the push message by determining that the security policies approve forwarding the push message to the user device and then by providing the push message to the user device in compliance with the security policies.

It is a still further aspect of the embodiments that the message sent to the push server further comprises authentication data generated at least in part using the server private key. The push server can use the server public key and the authentication data to authenticate the message by confirming that the message came from a source knowing the server private key.

It is a yet further aspect of the embodiments that a network gateway can be configured to provide network gateway services to a user device wherein network traffic between the user device and an outside network such as the Internet passes through the network gateway. The server private key can be stored in a key storage configured to store encryption keys and security keys. Push subscription storage can be configured for storing push subscription data received from the user device. The push subscription data comprising an endpoint URL can be provided to the user device by a push service in response to a push subscription request comprising a server public key, wherein a server key pair comprises the server public key and the server private key. Security policy storage can be configured for storing a plurality of security policies. The network gateway can be configured to enforce at least one of the plurality of security policies by blocking an encrypted direct communication between the user device and an outside device. The network gateway can send a message to the endpoint URL, the message comprising a proxy URL. A push server at the endpoint URL sends a push message comprising the proxy URL to the user device in response to receiving the message.

The proxy URL can be used to communicate with a proxy configured to provide indirect proxied communications between the user device and the outside device, wherein the indirect proxied communications are provided to the user device by the proxy at the proxy URL.

Before the proxy URL is provided to the user device, a captive portal web page comprising the server public key can be provided to the user device. The user device can use the server public key in a subscription request sent to a push server. The proxy URL can thereafter be provided to the user device via the push server. The network gateway or an associated device can send the proxy URL in a message to the endpoint URL. The push server, perhaps after using the server public key to authenticate the message, sends the proxy URL to the user device in a push message. The message can include authentication data generated at least in part using the server private key. All communications through the network gateway by the user device can be blocked until after the network gateway receives the push subscription data. Alternatively, all communications through the network gateway by the user device can be blocked, excepting push service communications, until after the network gateway receives the push subscription data.

The network gateway can provide a server public key to the user device. For example, upon startup, the user device or an application (e.g. web browser) can attempt to access the Internet by sending a communication to a desired location or URL. To reach its intended destination, the communication must traverse the network gateway because all of the user device's communications to or from the Internet must pass through the network gateway or an associated gateway. Associated gateways are other network gateways that also provide network gateway services to the user device. The network gateway can block the communication and instead provide a server public key to the user device. Note that many devices and web applications, such as browsers, check for a captive portal on startup by attempting to reach a known internet server. Instead of allowing access to that known server, the network appliance can provide a captive portal web page that includes the server public key. The server public key can be a VAPID (Voluntary Application Server Identification) key. The VAPID key is an element of VAPID which is specified by an IETF (Internet Engineering Task Force) RFC. Specifically, IETF RFC 8292 specifies VAPID and the VAPID key.

The user device, having received the server public key, can send a subscription request to a push service. The subscription request includes the server public key. The push service can return a subscription response comprising an endpoint URL. The push server and the user device can be on the same side of the network gateway. When both are on the same side, communications between the two do not have to traverse the network gateway. The push server and the user device can be on the different sides of the network gateway. When they are on the different sides, communications between the two must traverse the network gateway. In such cases, the network gateway can have security policies allowing the subscription request to reach the push server and for the subscription response to reach the user device. The endpoint URL can be of the form: https://pushserver.io/uniqueidentifier, which is a unique endpoint URL. Here, the HTTPS protocol is used to encrypt communications to the push server. The server address of the push server is "pushserver.io". The unique identifier "uniqueidentifier" can be created by the push service as a value that is uniquely associated with the user device and with the server public key. As such, the endpoint URL can be uniquely associated with the user device and with the server public key.

Here, a push service and a push server are referenced because the two function can be performed by the same machine or by different machines. The push service can receive subscription requests, register subscriptions with one or more push servers, and return the subscription response. The push server can receive push requests, determine if the push requests are valid, and send push messages to devices such as the user device. A push service can have many push servers.

Having received the endpoint URL, the user device can provide subscription data to the network gateway. The push subscription data comprises the endpoint URL provided to the user device by the push service in the response to the push subscription request comprising the server public key. The push subscription data can also include one or more encryption keys such as the server public key, a user public key, and an auth key. The auth key is a symmetric key.

As discussed above, the network gateway can provide gateway services to the user device. The network gateway can require having the subscription data before providing network gateway services to the user device. Before receiving the subscription data, the network gateway can deny such service by blocking all communications through the gateway by the user device until after receiving the push subscription data. Alternatively, the network gateway can deny such service by blocking all communications by the user device, excepting push service communications, through the gateway until after receiving the push subscription data.

As discussed above, the network gateway can act as a security appliance. An aspect of acting as a security appliance can be enforcing at least one of a plurality of security policies by blocking a communication from the user device to a recipient device. A user of the user device might not know that the communication was blocked or why it was blocked. The user can be informed by a push message. Having blocked a communication, the network gateway can proceed by sending a message to the endpoint URL, the message comprising policy information describing the blocking of the communication and comprising authentication data generated at least in part using the server private key. A push server is at the endpoint URL. The push server at the endpoint URL sends a push message to the user device in response to receiving the message, the push message comprising the policy information. The proxy URL can be provided with or as part of the policy information.

After receiving the subscription data, the network appliance can provide gateway services and full internet access to the extent allowed by the security policies. Receipt of push messages from the push server can be enabled by adding a new security policy to the plurality of security policies after receiving the push subscription data from the user device, the new security policy providing for allowing push messages to be sent to the user device. The push messages can be restricted by the security policies to include only those from the push server and perhaps other push servers marked or listed as approved push servers. The proxy can be considered to be a security appliance because the proxy can provide gateway services by receiving, processing, and forwarding/blocking communications between the user device and the outside device.

Before sending the push message to the user device, the push server can authenticate the push message using the server pubic key. By doing so, the push service determines that the push request came from a source knowing the server private key. Note that messages encrypted using one encryption key can also be encrypted using one or more other encryption keys. For example, the proxy URL in the push request can be encrypted using the server private key and then again using the user public key. If only the user device knows the user private key, then only the user device can read the proxy URL. Furthermore, the user device is assured that the network gateway or an associated device provided the proxy URL because, supposedly, only the network gateway knows the server private key. Alternatively, a symmetric key, referred to as "auth", known by the user device and the network gateway can be used. Assuming neither device has shared or lost control of the symmetric key, the user device is assured that the proxy URL came from the network gateway. IETF RFC 8291 titled "Message Encryption for Push" details aspects of such authentication and encryption.

The push message may need to pass through the network gateway in order to reach the user device. Upon receiving the push message from the push server, the network appliance can proceed by determining that the security policies approve providing the push message to the user device before providing the push message to the user device in compliance with the security policies. In many cases, the network gateway provides the push message to the user device by forwarding the communications from the push server to the user device.

Control of and access to network gateways is never assured. For example, the network gateway and the proxy can run as virtual machines within a host machine. If security is compromised, the host machine or another virtual machine might access the network gateway or proxy. In another scenario, the network gateway or proxy's virtual image can be stolen and analyzed. Physical hardware can also be stolen, imaged, or accessed by adversaries. It may therefore be advantageous for all the encryption keys to be stored in a secure vault. Network gateways and proxies can retrieve encryption keys from the secure vault only when needed and may maintain those keys in their own memory only while needed. Information within the secure vault is extremely difficult to learn without the proper authorization. Aspects of the method disclosed here, which can be implemented by network gateways and proxies, can be storing the server private key and the user public key in a secure vault, and obtaining the server private key and the user public key from the secure vault before sending the message, or push request, to the endpoint.

Another aspect of the embodiments can be a web page server configured to serve a captive portal web page to the user device before network gateway services are provided to the user device, the captive portal web page comprising the server public key.

It is a further aspect of the embodiments that a non-transitory computer readable medium stores computer readable instructions, that when executed on one or more processors, implement a method for using push notifications to establish proxied communications and for security policy enforcement. The method can comprise:
   a. providing gateway services to a user device wherein a plurality of security policies is enforced to restrict communication with the user device;
   b. detecting an encrypted direct communication attempt between the user device and an outside device;
   c. blocking the encrypted direct communication attempt in compliance with the plurality of security policies;
   d. providing indirect proxied communications between the user device and the outside device, wherein the user device communicates with a proxy, and wherein the proxy conducts encrypted proxy communications with the outside device;
   e. enforcing at least one of the plurality of security policies at the proxy, the proxy having unencrypted access to the user communication;
   f. providing a server public key to the user device, wherein a server key pair comprises the server public key and a server private key;
   g. receiving push subscription data from the user device, wherein the push subscription data comprises an endpoint URL (uniform resource locator) provided to the user device by a push service in response to a push subscription request comprising the server public key; and
   h. sending a message comprising a proxy URL to the endpoint URL, wherein a push server at the endpoint URL is configured to send a push message to the user device in response to receiving the message.

Non-transitory computer readable media can store data and computer readable instructions. A computer readable medium storing computer readable instructions that can be executed on one or more processors may implement methods for using push notifications to establish proxied communications and for security policy enforcement.

BRIEF DESCRIPTION OF THE FIGURES

The embodiments herein will be better understood from the following detailed description with reference to the drawings, in which.

DETAILED DESCRIPTION OF EMBODIMENTS

Figure 1:
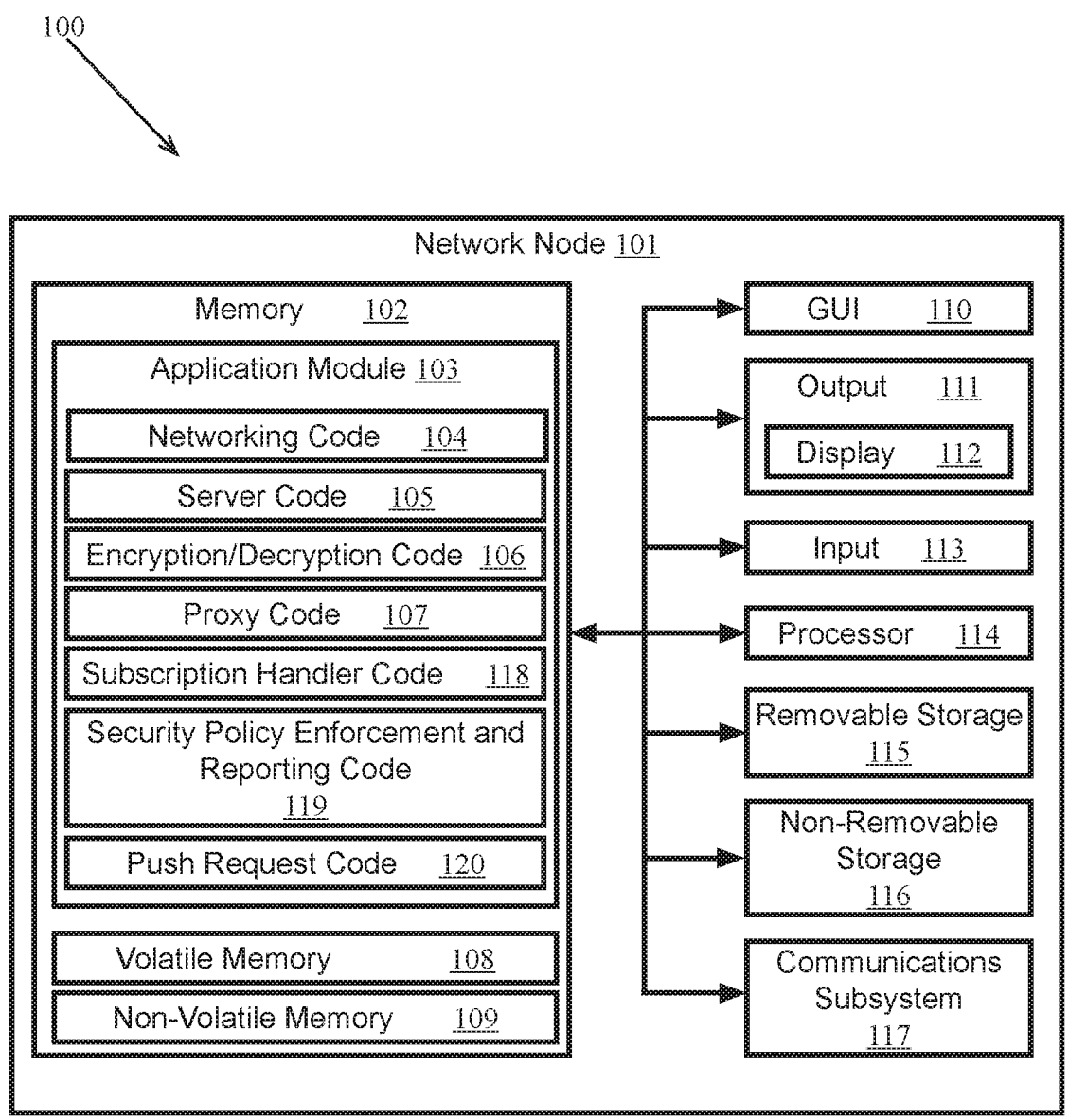
FIG. 1 is a high-level block diagram of a network node that can run a method for using push notifications to establish proxied communications and for security policy enforcement, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Network communications providers such as a company's information technology group are tasked with ensuring that network communications do not violate security policies. As such, communications between user devices and outside devices are monitored. Communications that violate the security policies are typically blocked. Here, user devices are those on an inside network to which the security policies can be applied and enforced. The outside devices are on an outside network. Communications from the inside network to the outside network must pass through a network gateway, security appliance, proxy, or other device that provides network connectivity between the inside network and the outside network.

Aspects of providing security and enforcing security policies can include inspecting network traffic for computer viruses, ransomware, blacklisted websites, etc. Such communications can be blocked or a security response can be activated. The contents of direct encrypted communications between a user device and an outside device cannot be inspected unless the encryption is broken. Here, it is assumed that the Internet's encryption technology is not broken. An example of direct encrypted communications is network traffic using the HTTPS network protocol. Use of HTTPS is being increasingly required to thwart eavesdropping and man-in-the-middle attacks. A side effect is that network protocols like HTTPS also thwart monitoring communications for security purposes.

One solution is to block direct encrypted communications and to provide indirect proxied communications. A user device can communicate with a proxy that communicates with the outside device. The proxy can receive network packets from the user device and forward them to the outside device. The proxy can also receive packets from the outside device and forward them to the user device. Network architects are familiar with proxies and proxy servers. In accordance with the embodiments, however, the proxy has access to unencrypted communications and can therefore enforce the security policies.

A person or user device trying to establish direct encrypted communications with an outside device may have no idea that the communications have been blocked, why they have been blocked, or that indirect proxied communications are available. A push server can inform the person or user device and can provide a proxy URL through which the user device can communicate with the outside device. The proxy, which is located at the proxy URL, can inspect the network traffic and enforce security policies.

User devices typically have the capability to connect to the network for communication purposes. Network service providers typically would like to provide network access under certain conditions, e.g., prepaid/postpaid network access, compliance with certain terms and conditions, etc., As soon as network connectivity is provided to a user device, the network service provider often redirects all traffic to a web page (also known as captive portal), as a first step in enforcing the network security policies, i.e., force the user to agree to terms and conditions before providing full network access.

Therefore, user devices can try to detect if the traffic is being directed to a captive portal. Typically, the user device makes a plain HTTP request to a well-known website/URL to detect if the traffic is being redirected to a captive portal. The website/URL that the user device attempts to reach (in order to detect the captive portal) may vary depending on the type of user device. For example, all devices manufactured by Apple that run the iOS or MacOS software attempt to connect to the URL http://captive.apple.com to detect captive portal redirection.

A security appliance, here also called a network gateway, may be deployed in the path of the network traffic from any user devices. As part of security inspection and policy enforcement, the security appliance may enforce policy actions by redirecting the HTTP traffic to a different web page (e.g. captive portal). On the captive portal, more information is displayed to the user, regarding the security policy enforcement for the HTTP request that was initiated by the user, using the user device.

Push notification technologies can be adapted for use in security policy enforcement. The adaptations are significant technological advances over the currently used push technologies and provide new and useful abilities to network security infrastructure. Push notifications are described in IETF RFC 8030 and the document "Push API" published by the W3C (a.k.a. the World Wide Web Consortium).

In order to send push notifications securely, the source web site that attempts to send push notifications may need to support VAPID keys for security purposes. Upon redirecting the user to the captive portal page, the user device can download or otherwise receive the public key of the security appliance, here called the server public key. The server public key can be used to create a subscription for push notifications. The user device can send the VAPID key in a subscription request to a push service or server. The push service or server can return a subscription response containing an endpoint URL. There are several services that offer push notifications. Examples of such services are: Apple Push Notification Service (APNS), Windows Push notifications, Firefox Push Notifications, etc. The user device can include the endpoint URL while creating subscription data for push notifications. The endpoint URL of the subscription can be treated as a unique identifier for the subscription (Subscription-ID).

The user device can save the Subscription-ID on a target website which can use the Subscription-ID to send push notifications to the user device. For example, the security appliance can host a website for the captive portal—therefore, the Subscription-ID would be saved on the security appliance.

The user device can run several applications that communicate using the network with other resources on the network. For example, an e-mail application attempts to send/receive e-mail by communicating with the e-mail server that is configured for the user. The network security appliances inspect the application traffic to potentially enforce security policy actions, depending on the security policies configured by the security administrator.

There can be a number of applications that send application traffic from the user device through the security appliance. The security appliance inspects the application traffic as configured, and in certain scenarios, security policy actions can be enforced for such traffic. For example, consider an example scenario where the e-mail application on the user device is receiving an e-mail with an attachment. Further, the security policy requires the security appliance to scan the e-mail attachment for viruses and block them if a virus was detected. If a virus was indeed detected in the e-mail attachment, the security appliance will block the attachment from being downloaded. However, in this scenario, the user who is using the user device to receive the e-mail will not have any indication why the attachment cannot be downloaded. In such a scenario, the security appliance can send a push request to the user indicating that a virus was detected in the e-mail attachment, thereby providing a more advanced and user-friendly security policy enforcement. In order to send the push notification, the security appliance can send a message, a push request, to the push server or service, using the Subscription-ID or subscription data that was created by the user device and saved on the security appliance.

As discussed above, if the communications between the user device and the email server are encrypted then the security appliance would be unable to inspect the email and determine that the email attachment contains a virus. As such, the communication may be blocked. Preferably, the user device or email application can be provided with a proxy URL such that email traffic can be shared via indirect proxied communications. The proxy can inspect the email, notice the viral attachment, and act accordingly. The security appliance can provide the proxy URL by including it in a push request sent to the endpoint URL.

Once the push service receives the push request from the security appliance, it can use the Subscription-ID to identify the user device that corresponds to the Subscription-ID. The push message is then delivered by the push service to the user device, thereby informing the user about the security policy action being enforced for the application traffic that is being sent from or to the user device.

Network security appliances can be deployed in computer networks in order to enforce network security policies on the traffic that is traversing the computer network. Firewalls, proxies, and network gateways are good examples of network security appliances. Depending on the network security policy defined on the network security appliance, specific policy actions are enforced on the network traffic, e.g., to allow or deny the traffic.

During the enforcement of security policy actions (e.g., deny certain traffic), the end-user experience is not user-friendly. For example, if the network security policy denies access for a certain network access, the end-user would not be able to determine if there is a network problem or if the network security appliance has denied the network access. To address end-user experience issues, security appliances can provide captive portal actions as an option of policy enforcement. A captive portal policy can redirect the user to a web page that provides more information about the security policy enforcement, so that an end-user's experience is enhanced. Alternatively, a service worker or thread running in the user device can display to the user the policy information received in a push message.

Captive portal policies that are not augmented by or integrated with the push notification technology disclosed herein have certain limitations, which makes them unusable in various types of scenarios, as described below:

1. Non-HTTP Traffic: Captive Portal policies can apply to HTTP traffic. For traffic that does not use HTTP, captive portal policies can be difficult or impossible to apply.
2. HTTPS Traffic: Captive Portal policies can rely on the ability to respond to an HTTP Request with a 302-Redirect message. However, if the traffic is encrypted using TLS, 302-Redirect response messages cannot be applied.
3. HTTP Traffic: Captive Portal policies rely on the ability to respond to an HTTP Request with a 302-Redirect message. In certain cases, as described below, security appliances can be unable to enforce captive portal policies even for HTTP traffic:
   a. HTTP 1.1 or 2.0: HTTP protocol versions 1.1 and 2.0 allow for multiple pipelined requests/responses for a single HTTP connection. In such a scenario, when security appliances enforce captive portal policy on one of the pipelined HTTP requests of the connection, the end-user experience is not consistent, and therefore captive policies become unreliable.
   b. Non-first-packet Response: For captive portal policies to work effectively, the 302-Response should be the first packet of the response. In certain scenarios, the security appliances would be unable to determine the policy enforcement action as the first-response-packet action, thus making captive portal actions unusable.

The limitations of captive portals and captive portal policies can be avoided through the use of push notifications as a mechanism of security policy enforcement by security appliances, so that the end-user experience is significantly enhanced.

FIG. 1 is a high-level block diagram 100 of a network node 101 that can run a method for using push notifications to establish proxied communications and for security policy enforcement, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface) 110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, server code 105, encryption/decryption code 106, proxy code 107, subscription handler code 118, security policy enforcement and reporting code 119, and push request code 120. A hard drive, CD-ROM, RAM, Flash Memory, and a USB drive are just some examples of articles including a computer-readable medium.

Figure 2:
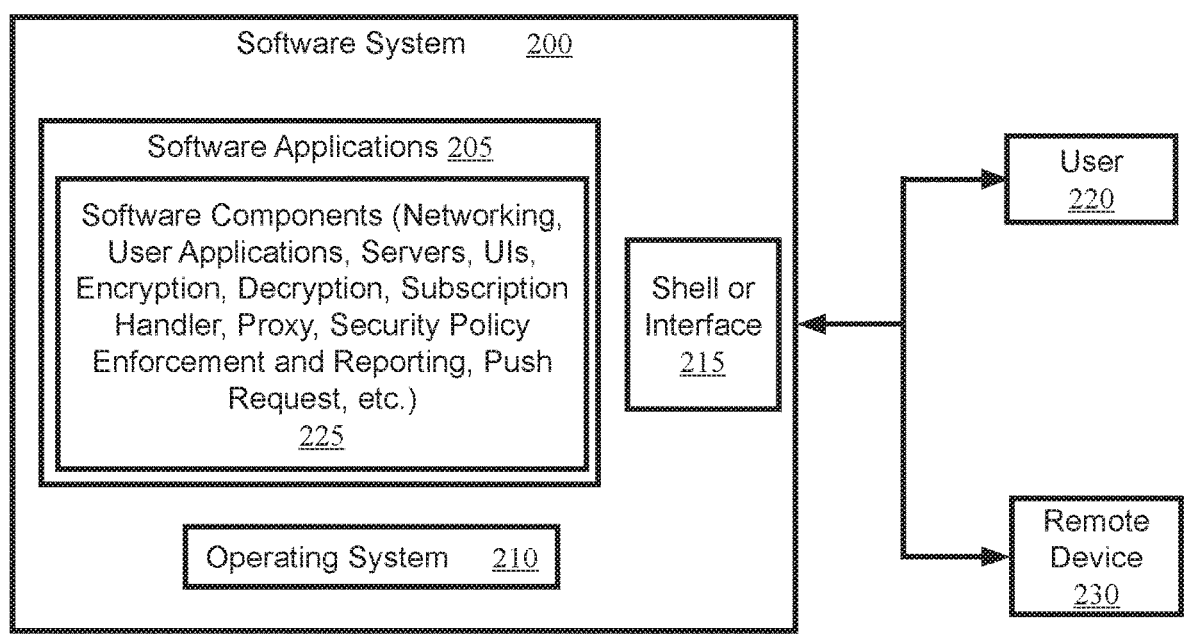
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software application 205, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, user application code, server code, UI code, encryption code, decryption code, subscription handler code, proxy code, security policy enforcement and reporting code, push request code, etc., etc. The software system 200 can have multiple software applications each containing software components. The network node 101 can receive user commands and data through interface 215, which can include input 113, output 111, and communications connection 117 accessible by a user 220 or remote device 230. These inputs may then be acted upon by the network node 101 in accordance with instructions from operating system 210 and/or software application 205 and any software components 225 thereof.

Generally, software components 225 can include, but are not limited to, routines, subroutines, software applications, programs, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. A VM or container typically supplies an operating environment, appearing to be an operating system, to program code in an application module and software applications 205 running in the VM or container. A single physical computer can run a collection of VMs and containers. In fact, an entire network data processing system including multitudes of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
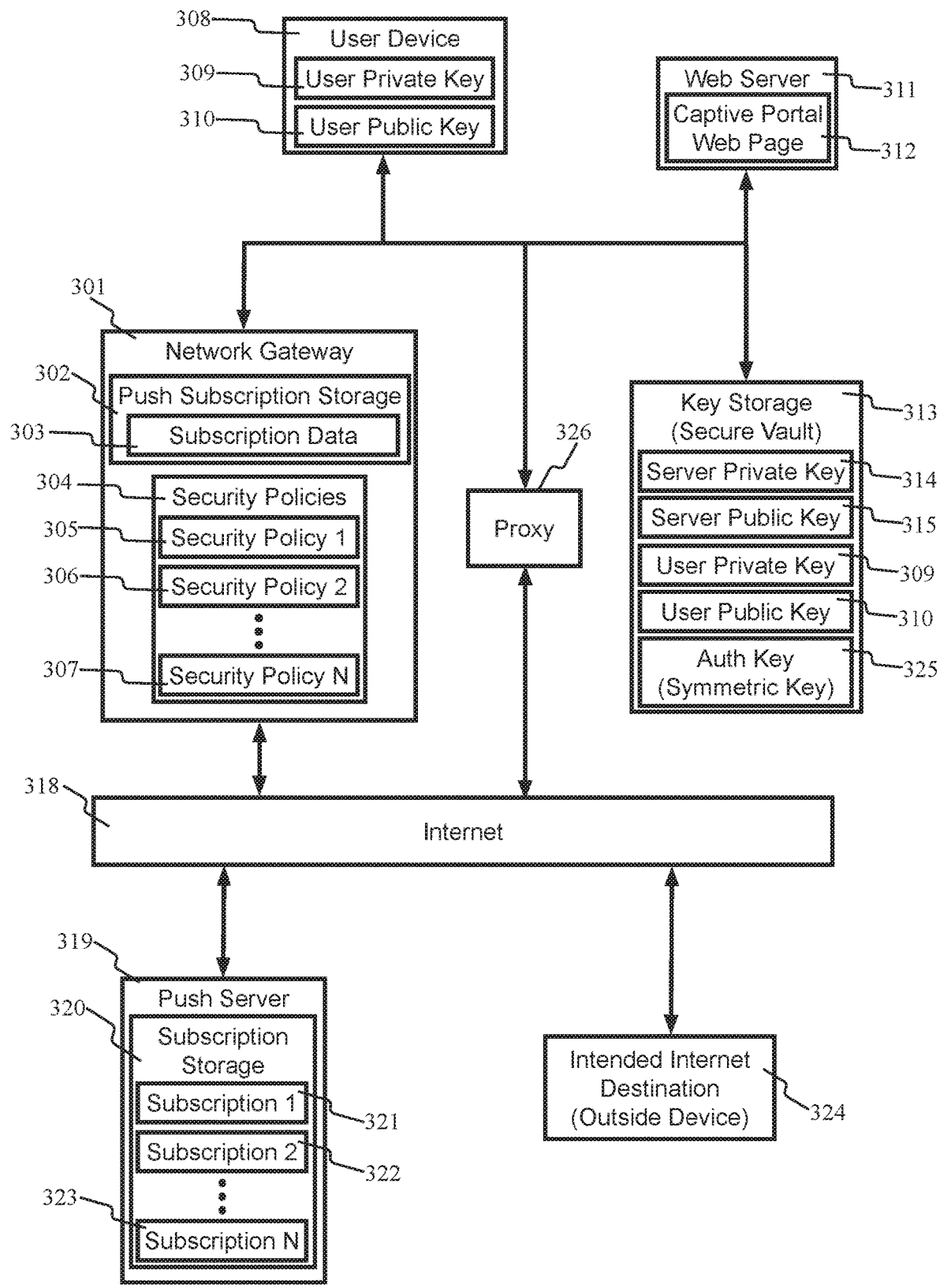
FIG. 3 is a high-level block diagram of a system for using push notifications to establish proxied communications and for security policy enforcement, according to embodiments disclosed herein.

FIG. 3 is a high-level block diagram of a system for using push notifications to establish proxied communications and for security policy enforcement, according to embodiments disclosed herein. A user device 308 can create a user key pair having a user private key 309 and a user public key 310. A network gateway 301 can provide network gateway services to the user device 308. As such, the network gateway 301 can forward communications from the user device 308, over the Internet 318, and to an outside device that is the intended internet destination 324. Here, the term "internet destination" is used with the understanding that an internet destination can be on the open internet out of an organization's control as well as on a private network, a corporate network, a virtual private network, or another destination. The network gateway 301 can also be a security appliance storing and enforcing security policies 304 such as security policy 1 305, security policy 2 306, and security policy N 307. In accordance with the security policies, the network gateway can redirect a communication to a web server 311 hosting a captive portal web page 312. Here, the web server 311 is illustrated as a separate machine but may alternatively be within a security appliance such as network gateway 301.

The network gateway 301 can store encryption and decryption keys within its own non-volatile memory. Alternatively, a key storage device 313, a secure vault, can store the keys and provide them only to authorized users and devices. The secure vault 313 is illustrated as storing the server private key 314, server public key 315, user private key 309, user public key 310, and the auth key 325. Key storage 313 can provide key storage service to the user device 308, web server 311, and network gateway 301. The user device 308 should not have access to the server private key 314. Similarly, the network gateway should not have access to the user private key 309. When using a secure vault 313, devices should store their own private keys only for as long as needed for performing a task requiring that key. Alternatively, a device may have its own secure vault internally. Those familiar with encryption key or password security are familiar with secure vaults.

The user device 308 can subscribe to a push server 319 by sending a subscription request containing the server public key 315. In response to receiving the subscription request, the push server 319 can create a subscription for the user device 308 and send a subscription response to the user device 308. The push server can store subscriptions in subscription storage 320 which is shown storing subscription 1 321, subscription 2 322, and subscription N 323. The user device 308 can create subscription data based at least in part on the subscription response. The subscription data can be provided to the network gateway 301 for storage and use. The network gateway 301 can store subscription data 303 in push subscription storage 302. The network gateway may alternatively store the subscription data 303 or subscription identifier in the secure vault 313.

A proxy 326 can provide proxied indirect communications between the user device 308 and the outside device 324. The proxy 326, here shown as a separate entity, can be included in the network gateway 310 as a proxy service. The proxy 326 can have access to or store security policies, can have push subscription storage storing push subscription data, and can have or access encryption keys.

Figure 4:
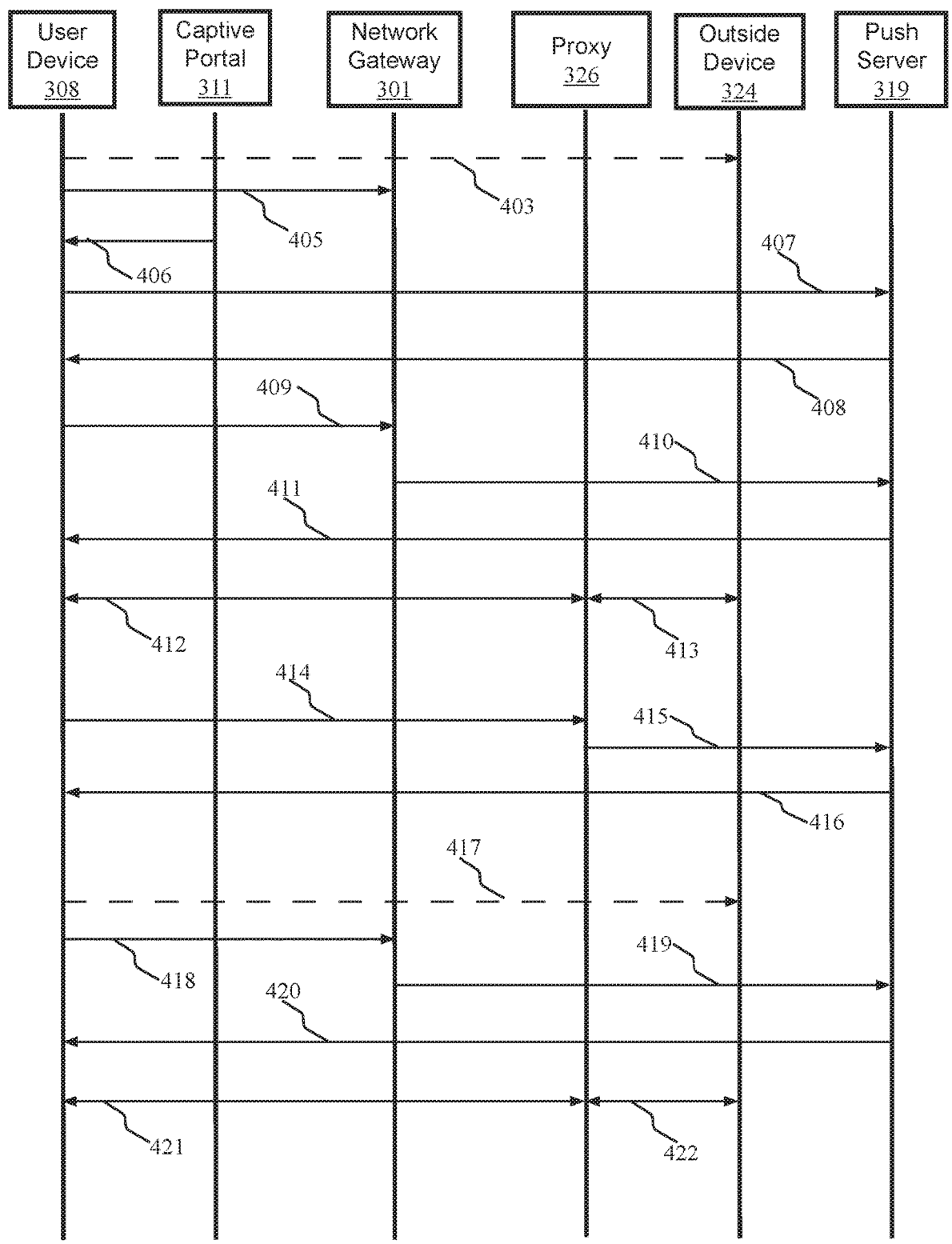
FIG. 4 is a high-level communications flow diagram of using push notifications to establish proxied communications and for security policy enforcement, according to embodiments disclosed herein.

FIG. 4 is a high-level communications flow diagram of using push notifications to establish proxied communications and for security policy enforcement, according to embodiments disclosed herein. A user device 308 can attempt to communicate 403 with an outside device 324 using direct encrypted communications such as HTTPS. In FIG. 4, attempted communications are shown as dashed lines. The network gateway 301 is providing network gateway services and is enforcing security policies. As such, the user device 308 attempts to send the communication 405 to outside device 324. The network gateway 301 blocks the communication 405 because the user device 308 has not provided subscription data to the network gateway 301. The network gateway 301 can direct the user device to a web server 311 hosting a captive portal which responds 406 to the user device 308 with the captive portal web page 312. The captive portal web page 312 can contain a server public key for the network gateway 301. Alternatively, the network gateway 301 or another device or information source knowing the server public key can provide the server public key directly to the user device 308 or provide it in some other manner. As discussed above, the user device can receive the server public key when the user device first connects to the network and checks for a captive portal. In such a scenario the attempted encrypted direct communication can begin with a connection to the network and a check for a captive portal. In all scenarios, however, the user device does receive the server public key.

The user device can send a subscription request 407 containing the server public key to a push server 319. The push server 319 can create a subscription for the user device 308 and can return a subscription response 408 containing a subscription identifier such as a unique endpoint URL. A subscription identifier can be an identifier that is uniquely associated with the user device 308 and the server public key 315. A unique endpoint URL can be an endpoint URL that is uniquely associated with the user device 308 and the server public key. Here, endpoint URLs are principally discussed although those practiced in the art of Internet communication would realize that other forms of subscription identifier can alternatively be used.

Having received the endpoint URL, the user device 308 can create subscription data and send the subscription data 409 to the network gateway 301. The network gateway 301 can store the subscription data.

The subscription data having been provided to the network gateway 301, the network gateway can send a push request 410 to the push server 319. The push request can contain a proxy URL. The push server 319 can authentication the push request 410 using the server public key. The push request 410 being authenticated, the push server 319 sends a push message 411 containing the proxy URL to the user device 308. The user device can then use the proxy URL to access the proxy 326. The proxy 326 provides indirect proxied communications 412, 413 between the user device 308 and the outside device 324. The indirect proxied communications 412, 413 consist of internal proxy communications 412 and external proxy communications 413. The internal proxy communications 412 are between the user device 308 and the proxy 326. The external proxy communications 413 are between the outside device 324 and the proxy 326.

The proxy 326 can enforce the security policies because the proxy 326 has access to the unencrypted version of the communications between the user device 308 and the outside device 324. The proxy can therefore read the communications and may detect a forbidden communication. A forbidden communication 414 from the user device 308 can be blocked by the proxy 326. A proxy 326 having access to subscription data for the user device 308 can send a push request 415 to the push server 319. The push request can contain data for informing the user that the communication was blocked and why. The push server can then send that data to the user in a push message 416.

In order for the push server 319 to authenticate the push request 415, the proxy needs to provide authentication data signed with an appropriate key. The server private key 314 or the subscription data 303 can be provided to the proxy 326 and to any other associated security appliances providing gateway services or proxy services. Alternatively, the proxy 326 can provide its own public key to the user device such that the user device registers another push subscription using the proxy's public key and provides the proxy with subscription data enabling the proxy to push information to the user device via a push server. Yet another alternative is that the proxy can cause the network gateway or another device to send a push request on behalf of the proxy.

At message 409, the user device 308 provides subscription data to the network gateway. At some later time, the user device can make encrypted direct communication attempt 417 by sending network traffic 418 toward the outside device 324. The network gateway blocks the attempted communication and can immediately send a push request 419 containing a proxy URL to the push server 319. The push server 319 can then send the proxy URL to the user device 308 in a push message 420. The user device 308, proxy 326, and outside device 324 can then engage in indirect proxied communications 421, 422.

Referring to the blocked communications of FIG. 4, a user of user device 308 can learn of blocked communications, security policies, and proxy URLs from the push messages. Without the push messages, the user would be uninformed. It is by providing this information to the user that the embodiments are an advance over current technology.

Figure 5:
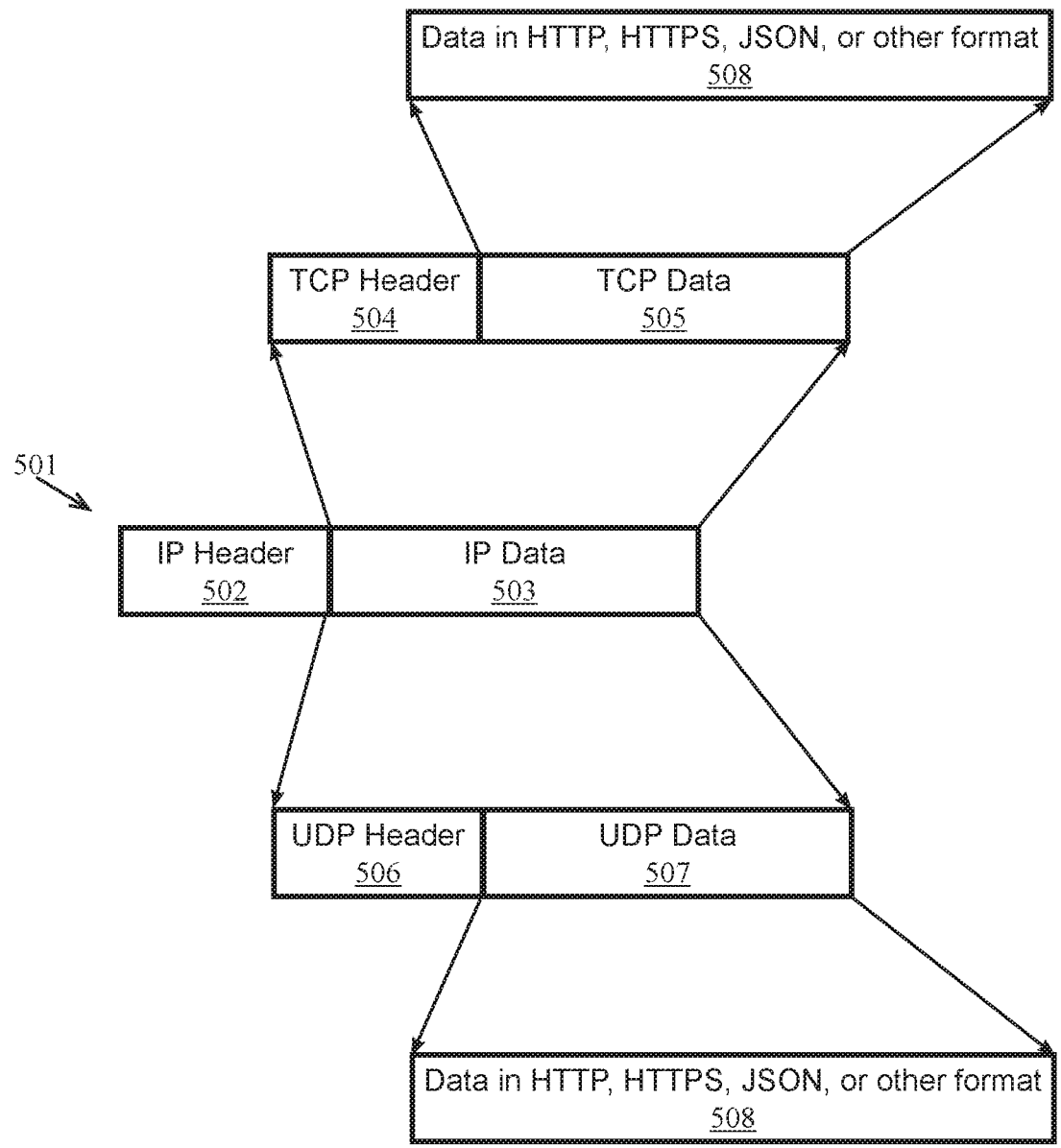
FIG. 5 is a high-level block diagram of network packets useful for using push notifications for using push notifications to establish proxied communications and for security policy enforcement, according to embodiments disclosed herein.

FIG. 5 is a high-level block diagram of network packets useful for using push notifications for using push notifications to establish proxied communications and for security policy enforcement, according to embodiments disclosed herein. IP (internet protocol) packets 501 carry substantially all of the network traffic on the Internet. An IP packet contains an IP header 502 and IP data 503. The IP data 503 can contain TCP (transmission control protocol) information such as a TCP header 504 and TCP data 505. An IP packet containing TCP information is often called a TCP/IP packet or TCP packet. The IP data 503 can contain UDP (user datagram protocol) information such as a UDP header 506 and UDP data 507. An IP packet containing UDP information is often called a UDP/IP packet or UDP packet. Data in HTTP, HTTPS, JSON, or other formats 508 can be contained within UDP data 507 or TCP data 505. FIGS. 6-11 illustrate data objects that can be contained by UDP data 507 or TCP data 505.

Figure 6:
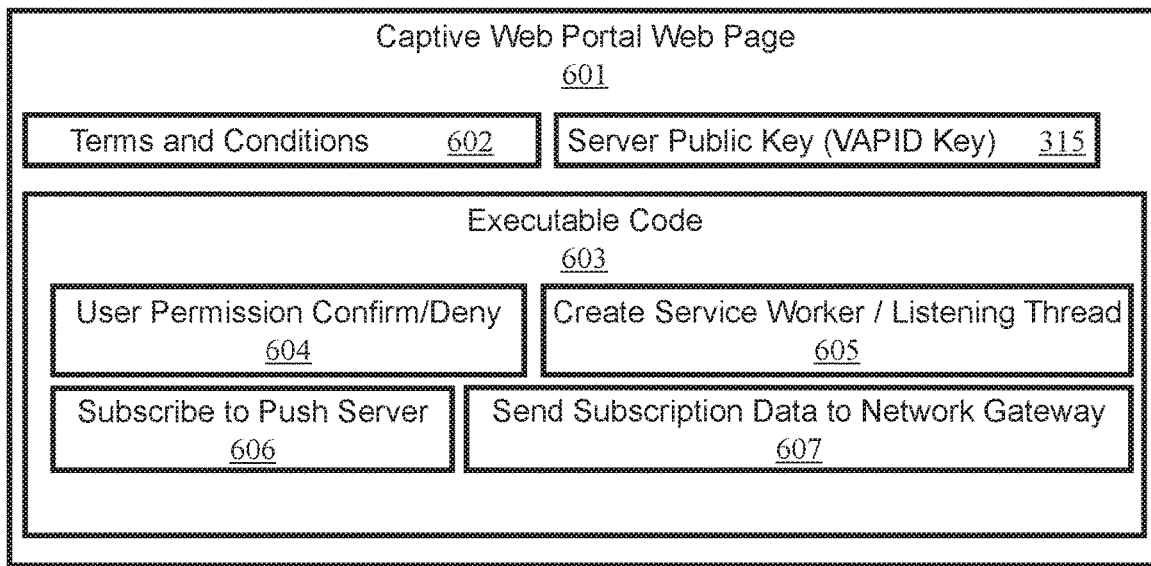
FIG. 6 illustrates a captive web portal page, according to embodiments disclosed herein.

FIG. 6 illustrates a captive web portal page 601, according to embodiments disclosed herein. The captive web portal page can contain terms and conditions 602, executable code 603, and a server public key 315. As discussed above, the server public key 315 can be a VAPID key. The terms and conditions 602 can be readable text informing users that they are being requested to subscribe the user device to a push service, why the request is being made, and other information. The executable code 603 can contain code for user permission confirm/deny 604, to create a service worker or listening thread 605, to subscribe to the push server 606, and to send subscription data to the network gateway 607. Code for user permission confirm/deny 604 can provide for accepting a user's input regarding agreeing to the terms and conditions and for obtaining the users permission to subscribe the user device to a push server. Code for subscribing to a push server 606 can send a subscription request and receive a subscription response. Code for sending subscription data to the network gateway 607 can process the subscription response, form the subscription data, and send the subscription data to the network gateway. Code for creating a service worker or listening thread 605 can configure the user device 308 to listen for push notifications from the network gateway.

Figure 7:
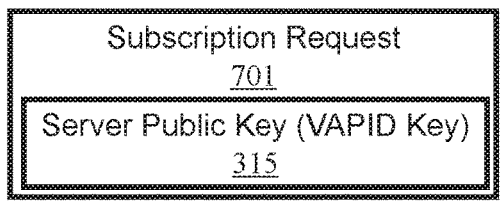
FIG. 7 illustrates a subscription request, according to embodiments disclosed herein.

FIG. 7 illustrates a subscription request 701, according to embodiments disclosed herein. The subscription request 701 can contain the server public key or VAPID key 315 for the network gateway 301.

Figure 8:
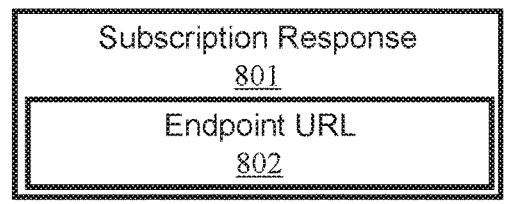
FIG. 8 illustrates a subscription response, according to embodiments disclosed herein.

FIG. 8 illustrates a subscription response 801, according to embodiments disclosed herein. The subscription response 801 can contain a subscription identifier that is uniquely associated with the server public key 315 and the user device 308. The illustrated subscription identifier is a unique endpoint URL 802.

Figure 9:
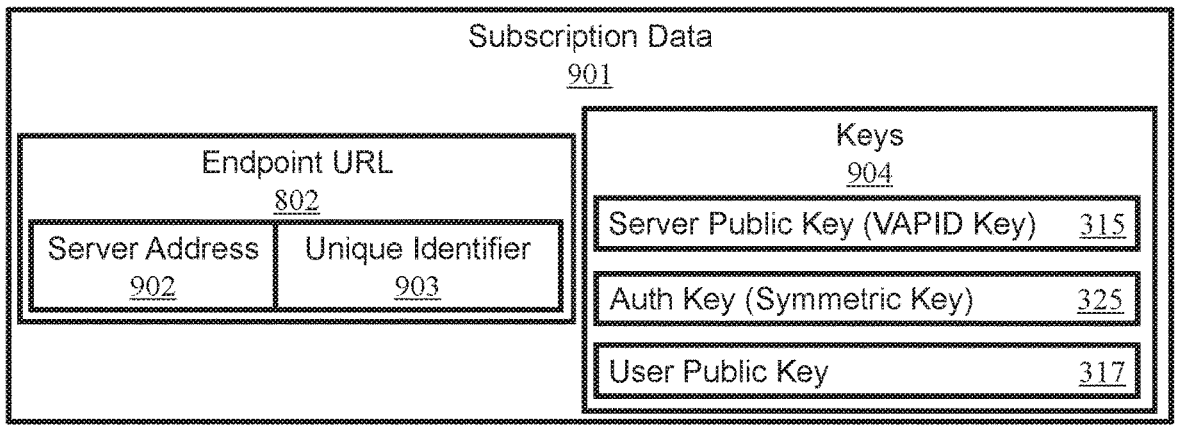
FIG. 9 illustrates push subscription data, according to embodiments disclosed herein.

FIG. 9 illustrates push subscription data 901, according to embodiments disclosed herein. The push subscription data 901 can be assembled by the user device 308 and sent to the network gateway 301 for storage there. The push subscription data 901 can contain the endpoint URL 802 and encryption/decryption keys 904. The endpoint URL can include a server address 902 and a unique identifier 903. Keys 904 can contain the server public key 315, an auth key 325, and a user public key 310. The auth key 325 can be a symmetric key known by both the network gateway 301 and the user device 308. A user key pair can include the user public key 310 and a user private key. The user device 308 can keep the user private key while sharing the user public key 310 with other devices such as the network gateway 301. The subscription data 901 can contain all, one, none, or any combination of the keys 904.

Figure 10:
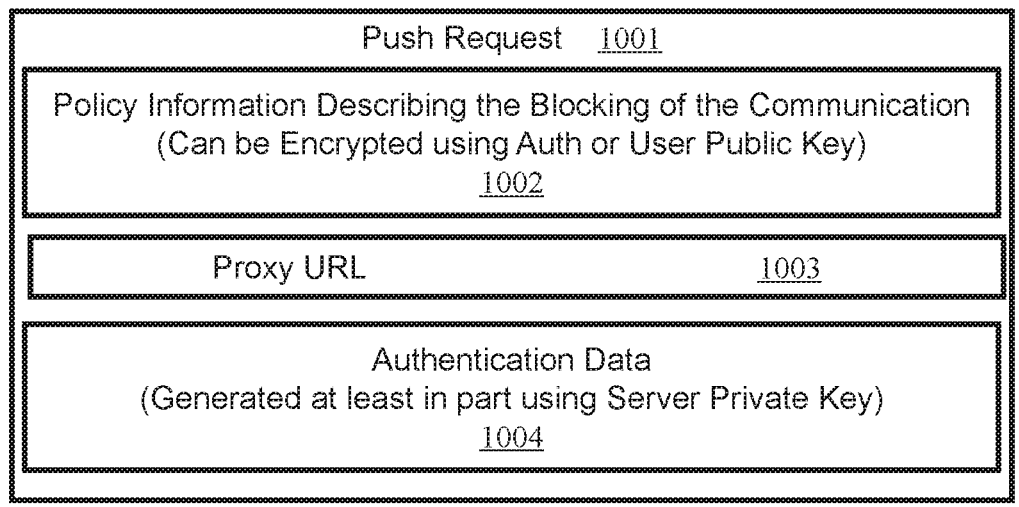
FIG. 10 illustrates a push request, according to embodiments disclosed herein.

FIG. 10 illustrates a push request 1001, according to embodiments disclosed herein. A push request can contain policy information 1002, a proxy URL 1003, and authentication data 1004. The network gateway can generate the authentication data 1004. The authentication data 1004 can be generated, at least in part, using the server private key 314. The push server 319, having the server public key 315, can then authenticate the push request 1001 and ensure that it came from the network gateway 301 or another source having the server private key 314. The policy information 1002 can describe the blocking of the communication by disclosing that the communication was blocked based on a security policy and can provide further detail regarding the security policy and how to address the blockage. The policy information can also be provided in the form of a URL that can be followed to learn the details regarding the blockage. The proxy URL can be a base address of the proxy or can include additional information such as a unique identifier. A base address can be "https://proxy.corp.com". A base address with a unique identifier can be "https://proxy.corp.com/uniqueness". In the first form, the base address of the proxy is provided and the user can provide the proxy with information related to the outside device. The second form provides the base address and a unique identifier "uniqueness". The unique identifier can be associated with the user device, the outside device, or both. An association with the user device provides for the proxy to automatically access subscription data and other data associated with that user device. An association with the outside device provides for the proxy to establish the connection for external proxy communications 413 without requiring the user to provide the URL of the outside device. The policy information 1002 and proxy URL 1003 can be encrypted using auth (the symmetric key discussed above) or the user public key. Using the user public key ensures that only the user can read the policy information or proxy URL. Use of the symmetric key shows that the information came from the network gateway 301 or another device having the auth key.

Figure 11:
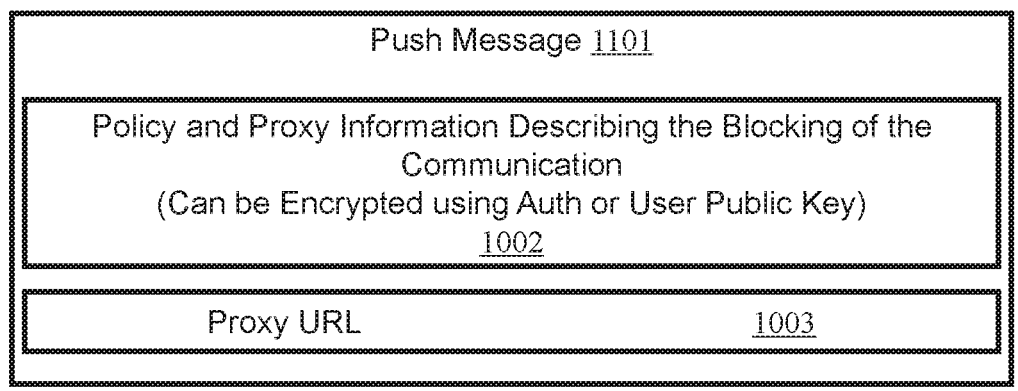
FIG. 11 illustrates a push message, according to embodiments disclosed herein.

FIG. 11 illustrates a push message 1101, according to embodiments disclosed herein. After receiving a push request 1001, a push server 319 sends a push message to the user device 308. The push message can contain the policy information 1002 and the proxy URL 1003 from the push request 1008.

Figure 12:
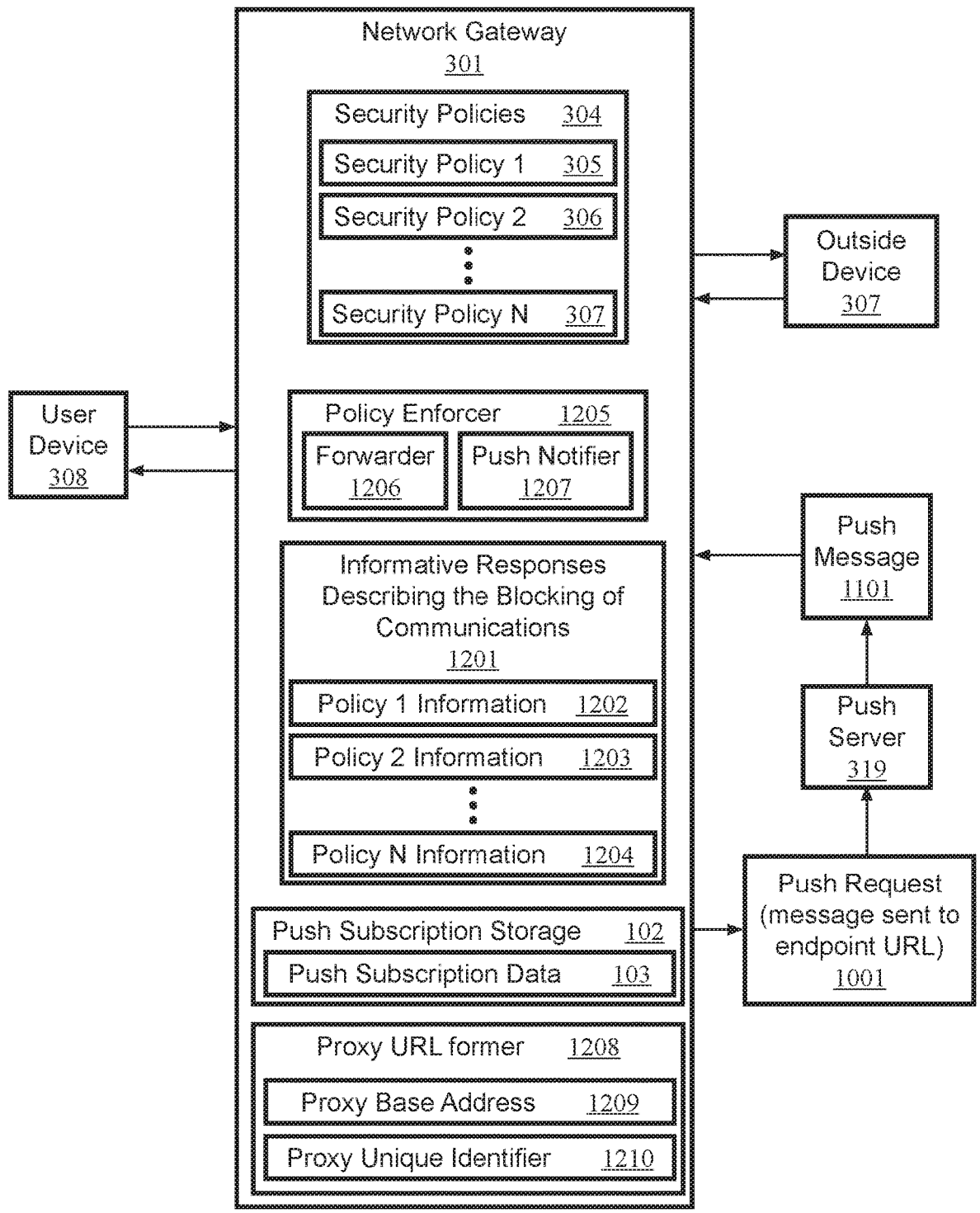
FIG. 12 illustrates a network gateway enforcing security policies, according to embodiments disclosed herein.

FIG. 12 illustrates a network gateway 301 enforcing security policies 304, according to embodiments disclosed herein. A user device 308 and an outside device 324 can attempt to communicate with one another. The communications must pass through a network gateway 301 providing network gateway services and acting as a security appliance. A policy enforcer 1205 can inspect each communication and determine which, if any, security policies 304 apply to that communication. If a communication is allowed, a forwarder 1206 can forward the communication to its destination. If a communication is not allowed, then a push notifier 1207 can send a push request 1001 to the push server 319. Recall that the subscription data can include an endpoint URL. The push notifier 1207 can look up the endpoint URL for the user device and send the push request 1001 to that endpoint URL. The push request 1001 can contain policy information describing the blocking of the communication. Informative responses 1201 describing the blocking of communications can store policy information such as policy 1 information 1202, policy 2 information 1203, and policy N information 1204. Note that "N" is used herein as a generic integer and is not constrained to be the same value wherever it is used. The security policies 304 can be associated with the informative responses 1201. As such, the network gateway can produce push requests containing policy information associated with the security policy or policies that disallow a communication. Proxy URL former 1208 can form proxy URLs. The proxy base address 1209 can simply be the base address (i.e. "proxy.corp.com", IP4 address, or IP6 address). The proxy unique identifier 1210 can be the "uniqueness" described above. The data associated with the proxy unique identifier 1210, such as identifying data for the user device 308 or outside device 324, should be shared with the proxy that is to provide proxy services.

An aspect of FIG. 12 suggests that devices on either side of the network gateway 301 can provide subscription information and thereafter be informed of when and why the network gateway blocks communications from or to that device. The discussion herein concentrates on user devices on the inside instead of those outside. A device is "inside" when the network gateway, or associated network gateways, provide gateway services such that the device can reach the Internet as a whole. Device are outside when they aren't inside. The security policies can be configured to allow all or a select few outside devices to submit subscription data and thereby receive push notifications from the network gateway. Selectively allowing outside device such access may be useful for network trouble shooting and for quickly detecting network disruptions. The policy information can be text, web pages, or URLs that can inform the recipient of the push message that a communication was blocked and why it was blocked.

In many installations, a network gateway/security appliance enforcing the security policies via push notifications is not necessarily the same device as that which provided the server public key to the user device. For example, network gateway services can be provided by a number of network gateways where certain of the network gateways can be redundant, backup, or at different locations. As such, the push subscription data can be stored in a secure vault or another subscription data store that can be accessed by the various network gateways, proxies, and security appliances that are enforcing the security policies.

Figure 13:
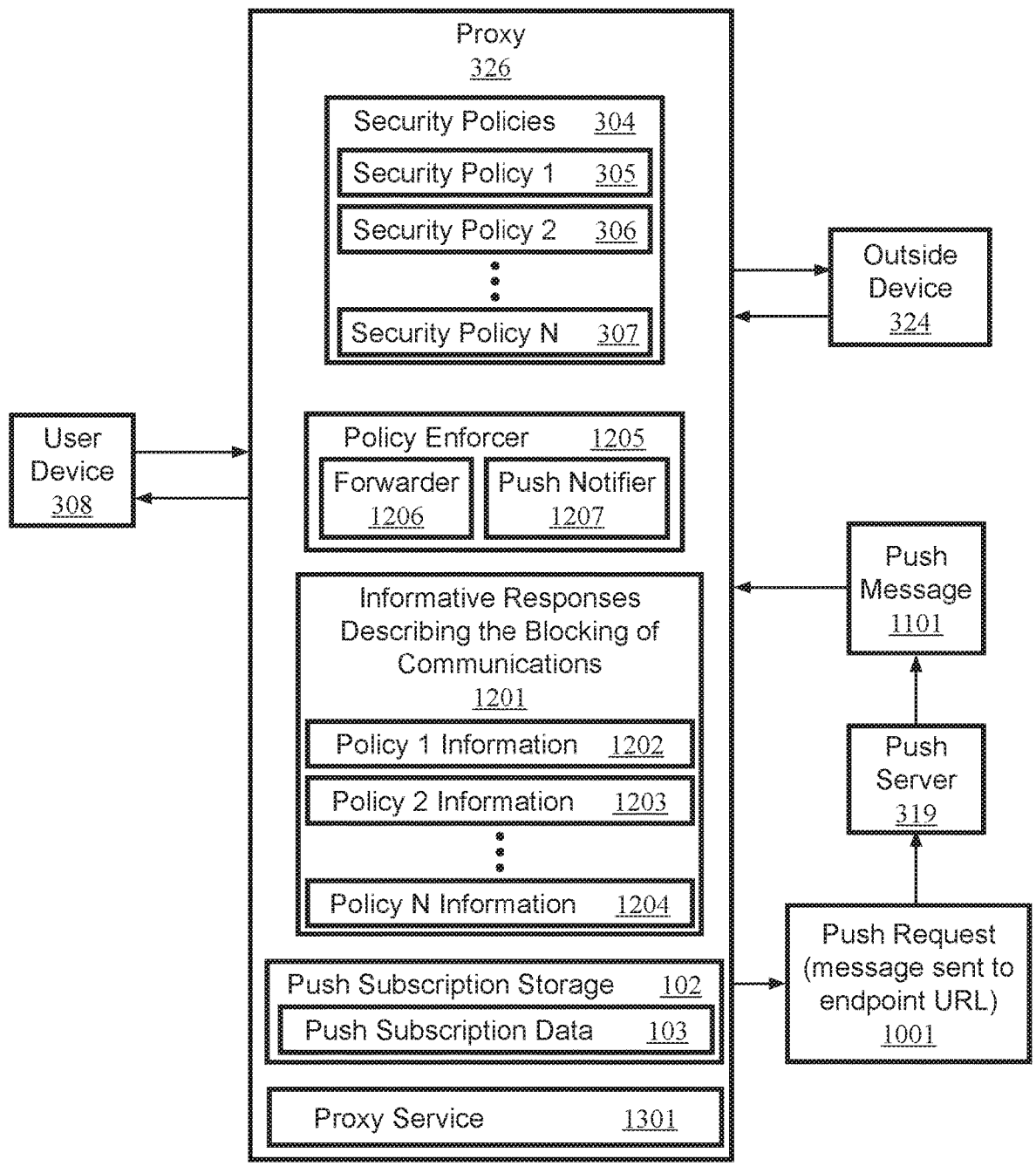
FIG. 13 illustrates a proxy providing indirect proxied communications and enforcing security policies, according to embodiments disclosed herein.

FIG. 13 illustrates a proxy providing indirect proxied communications and enforcing security policies, according to embodiments disclosed herein. The proxy 326 is almost identical to the network gateway 301 of FIG. 12. The differences are that the proxy 326 includes a proxy service 1301 and does not include proxy URL former 1208. In practice, all of the network gateway functionality and proxy functionality can be combined into a single entity or can be distributed among a number of cooperating entities. For example, one entity can inspect network traffic, another can enforce security policies, another can form and send push requests, and another can provide proxy services. Those familiar with software engineering are practiced in refactoring software.

Figure 14:
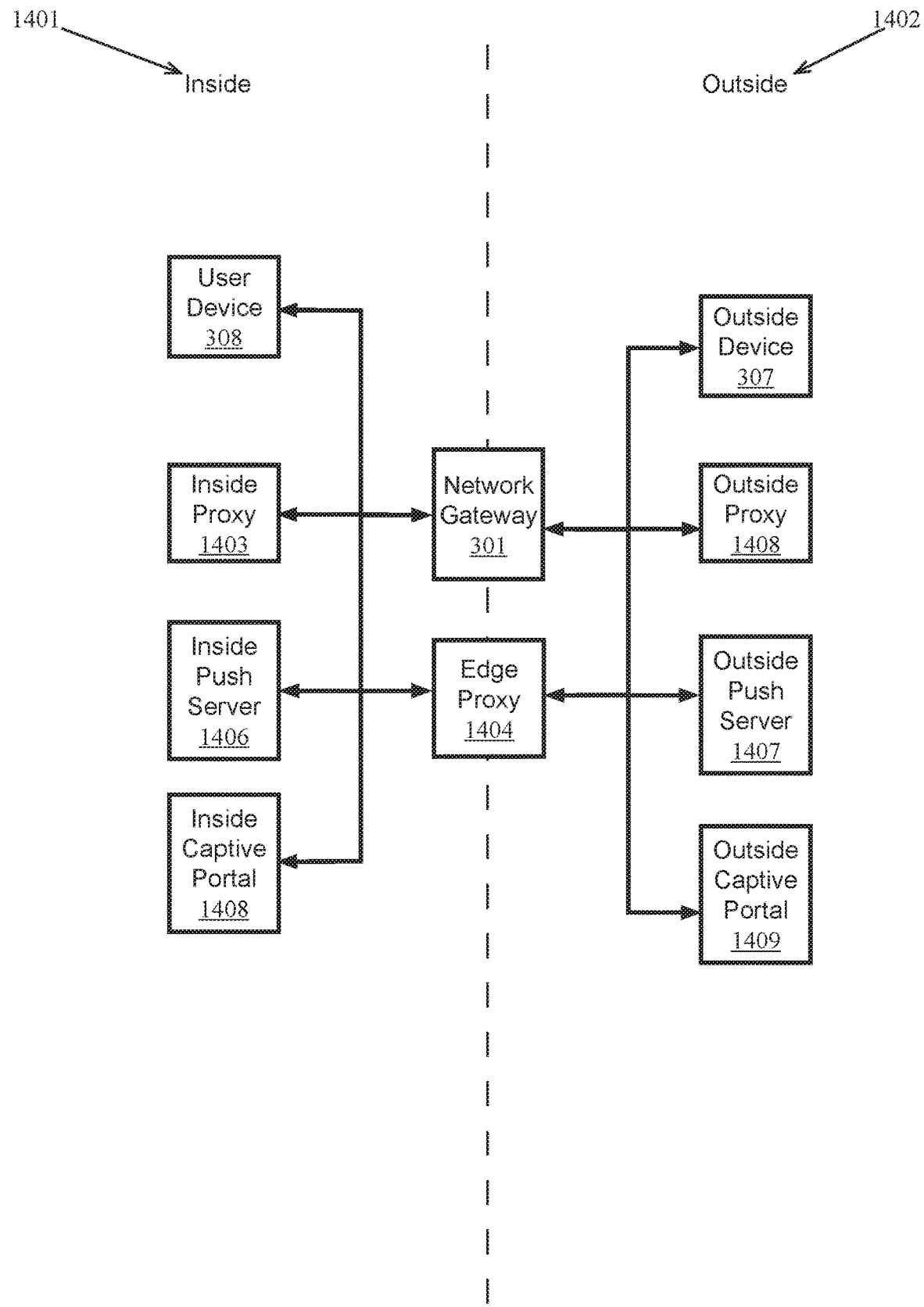
FIG. 14 illustrates network locations of network devices, according to embodiments disclosed herein.

FIG. 14 illustrates network locations of network devices, according to embodiments disclosed herein. A device is "inside" 1401 when the network gateway, or associated network gateways, provide gateway services such that the device can reach another network or the Internet as a whole. Device are outside 1402 when they aren't inside 1401. The user device 308 is an inside device that is on the inside 1401. The outside device 307 is outside 1402. Other inside devices can include an inside proxy 1403, inside push server 1406, and inside captive portal 1408. The devices that are outside can include outside proxy 1408, outside push server 1407, and outside captive portal 1409. The network gateway 301 and edge proxy 1404 are both inside 1401 and outside 1402 because they can communicate directly with devices that are inside and with devices that are outside. The security policies should be adapted for where the network elements are located. For example, communications between an inside proxy 1403 and an outside device 307 should be considered safe if the inside proxy 1403 enforces the security policies. Similarly, communications between an outside proxy 1408 and a user device 308 should be considered safe if the outside proxy 1408 enforces the security policies and is itself secured from other outside devices and malicious actors.

Figure 15:
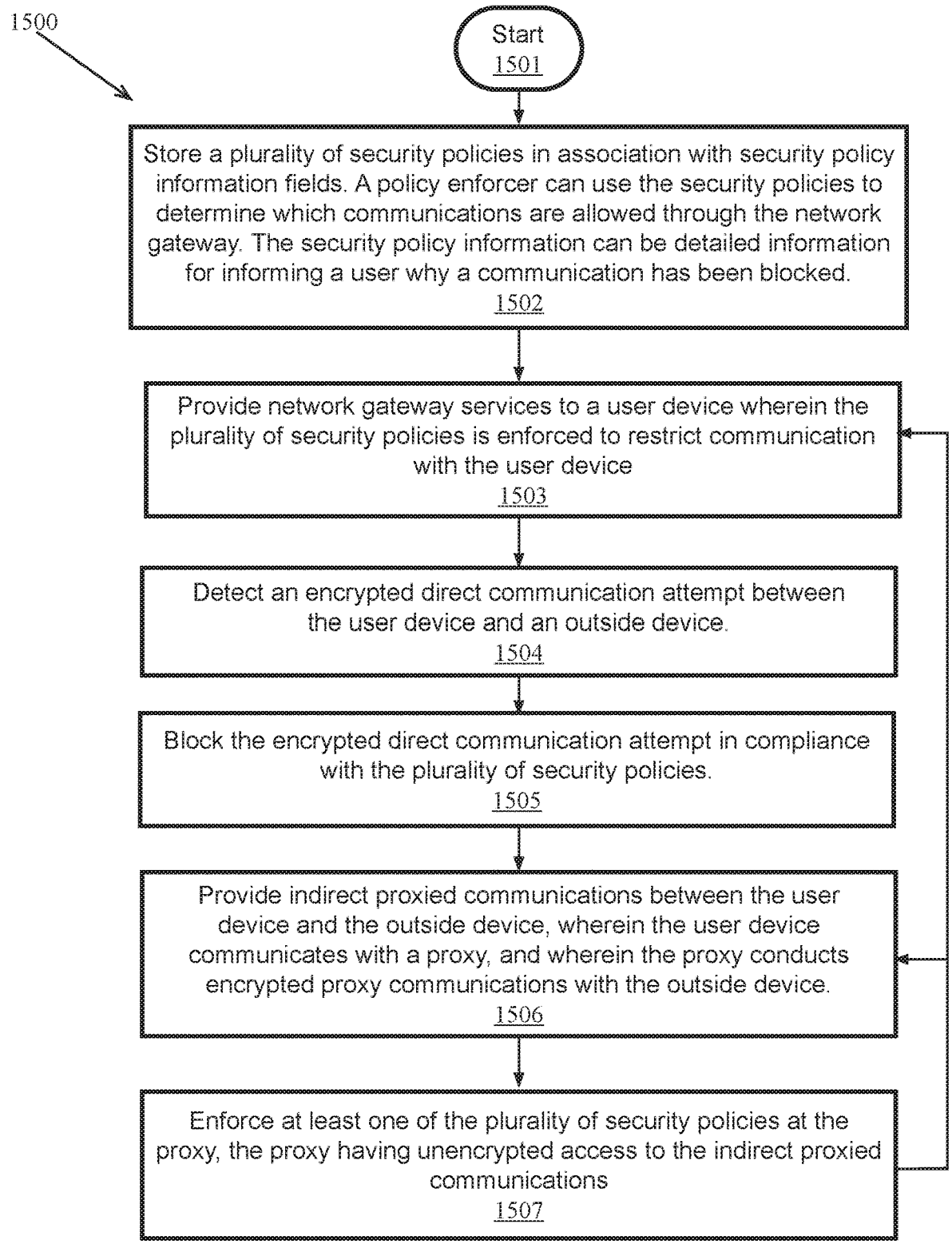
FIG. 15 illustrates a flow chart illustrating a method for using push notifications to establish proxied communications and for security policy enforcement, according to embodiments disclosed herein.

FIG. 15 illustrates a flow chart illustrating a method 1500 for using push notifications to establish proxied communications and for security policy enforcement, according to embodiments disclosed herein. After the start 1501, security policies 304 can be stored in association with security policy information fields 1201. A policy enforcer 1205 can use the security policies 304 to determine which communications are allowed through the network gateway 301. The security policy information 1202, 1203, 1204 can be detailed information for informing a user why a communication has been blocked.

Having stored security policies and policy information, the process can provide network gateway services to a user device wherein the plurality of security policies is enforced to restrict communication with the user device 1503. While providing gateway services, the process can detect an encrypted direct communication attempt between the user device and an outside device 1504 and can block the encrypted direct communication attempt in compliance with the plurality of security policies 1505. The direct encrypted communications having been blocked, the process can provide indirect proxied communications between the user device and the outside device, wherein the user device communicates with a proxy, and wherein the proxy conducts encrypted proxy communications with the outside device 1506. At least one of the plurality of security policies can be enforced at the proxy, the proxy having unencrypted access to the indirect proxied communications 1507

The method 1500 is illustrated as looping back to elements 1503 and 1506 because the method continues providing gateway services 1305, providing indirect proxy communications 1506, and enforcing security policies at the proxy 1507.

Figure 16:
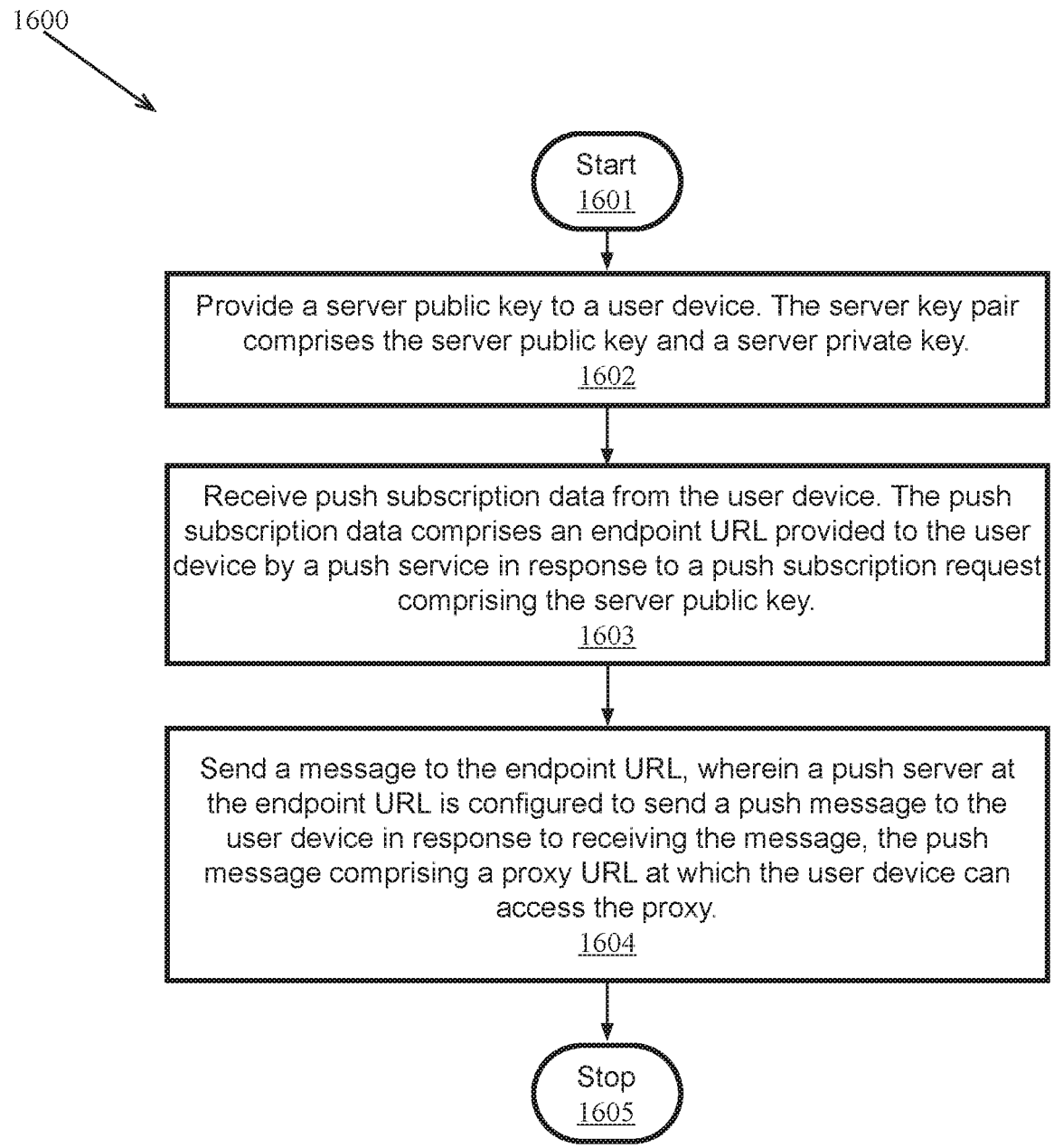
FIG. 16 illustrates a flow chart illustrating a method for providing a proxy URL to a user device, according to embodiments disclosed herein.

FIG. 16 illustrates a flow chart illustrating a method for providing a proxy URL to a user device 1600, according to embodiments disclosed herein. After the start 1601 a security appliance can provide a server public key to a user device 1602. The server key pair comprises the server public key and a server private key. The security appliance can receive push subscription data from the user device 1603. The push subscription data comprises an endpoint URL provided to the user device by a push service in response to a push subscription request comprising the server public key. At this point, the subscription is established and the security appliance has been provided with the subscription data. As such, the security appliance can send a message, a push request, to the endpoint URL 1604. The push request can comprise the proxy URL. A push server at the endpoint URL is configured to send a push message to the user device in response to receiving the message, the push message comprising a proxy URL at which the user device can access the proxy. The push request having been sent; the process can sop 1605. Note that steps 1602 and 1603 can be bypassed if the security appliance already has the subscription data.

Figure 17:
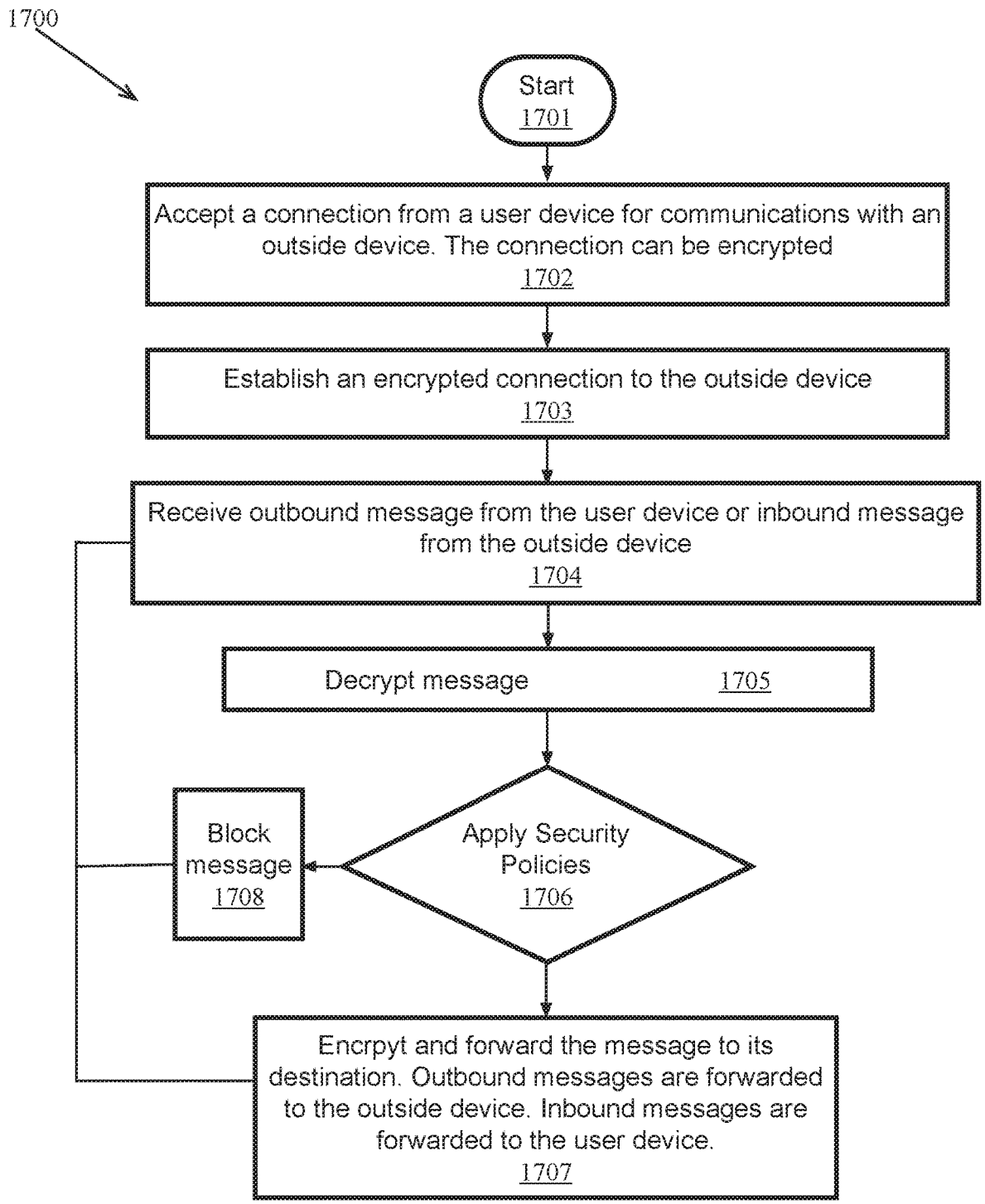
FIG. 17 illustrates a flow chart illustrating a method for providing indirect proxied communications, according to embodiments disclosed herein.

FIG. 17 illustrates a flow chart illustrating a method for providing indirect proxied communications 1700, according to embodiments disclosed herein. After the start 1701 the proxy can accept a connection, message, or network packet from a user device for communications with an outside device 1702. The connection, message, or network packet can be encrypted. Here connection refers to connections related to connection-based protocols such as TCP/IP. The proxy can establish an encrypted connection to the outside device 1703. Note that connections are not required when using connectionless protocols such as UDP. The proxy can receive an outbound message from the user device or an inbound message from the outside device 1704. The messages are network traffic such as individual network packets or groups of packets that together form a complete message. For example, a complete TCP/IP message can be split over many network packets and the complete message can be reassembled from the individual packets. The proxy can decrypt the messages because the proxy is the endpoint for user device to proxy communications and for outside device to proxy communications. Indirect proxy communications are a combination of user device to proxy communications and outside device to proxy communications. Having decrypted the message, the proxy can apply the security policies 1706. The proxy can enforce the security policies by blocking the message 1708 or by forwarding the message to its destination 1707. Outbound messages are forwarded to the outside device. Inbound messages are forwarded to the user device. The process is illustrated as looping back to element 1704 because the proxy continues providing proxy services. With respect to the user device, the proxy, and the outside device, the proxy services are the indirect proxied communications provided by the proxy.

The embodiments herein principally discuss a user device subscribing to a push service and receiving push notifications. It is understood that such actions can also be performed by an application running on the user device. For example, phone running the android operating system can subscribe to a push service using s server public key and can receive push messages responsive to a network gateway's push requests. Similarly, a web browser running on that phone can subscribe to a push service using the server public key and can receive push messages responsive to the network gateway's push requests. In some scenarios, the phone and the browser can each have a push server subscription such that each receives push messages, perhaps from different push servers at different endpoint URLs.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   providing gateway services to a user device wherein a plurality of security policies is enforced to restrict communication with the user device;
   detecting an encrypted direct communication attempt between the user device and an outside device;
   blocking the encrypted direct communication attempt in compliance with the plurality of security policies;
   providing indirect proxied communications between the user device and the outside device, wherein the user device communicates with a proxy, and wherein the proxy conducts encrypted proxy communications with the outside device;
   enforcing at least one of the plurality of security policies at the proxy, the proxy having unencrypted access to the indirect proxied communications;
   receiving an endpoint URL (uniform resource locator) provided to the user device by a push service in response to a push subscription request that includes a server public key; and
   sending a message to the endpoint URL, wherein a push server at the endpoint URL is configured to send a push message to the user device in response to receiving the message, the push message comprising a proxy URL for accessing the proxy by the user device.

2. The method of claim 1 further comprising:
   providing a captive portal web page to the user device before providing the proxy URL to the user device, the captive portal web page comprising the server public key.

3. The method of claim 1 comprising:
   blocking all communications through a network gateway by the user device until after receiving the endpoint URL.

4. The method of claim 1 comprising:
   blocking all communications by the user device, excepting push service communications, through a network gateway until after receiving the endpoint URL.

5. The method of claim 1 wherein the message comprises the proxy URL.

6. The method of claim 5 wherein the message includes authentication data generated at least in part using server private key that is in a server key pair with the server public key.

7. The method of claim 1 further comprising:
   receiving the push message from the push server;
   determining that the plurality of security policies approve providing the push message to the user device; and
   providing the push message to the user device in compliance with the plurality of security policies.

8. A system comprising:
   a memory;
   a processor operatively coupled to the memory;
   a network gateway that includes the processor and the memory;
   a key storage device storing a server private key; and
   a push subscription storage configured to store a push subscription data that includes an endpoint uniform resource locator (URL),
   wherein
   the network gateway provides network gateway services to a user device,
   the server private key and a server public key are a server key pair,
   a push service sends the push subscription data to the user device in response to receiving a push subscription request that includes the server public key,
   the push subscription data is forwarded to the user device by the network gateway,
   the push subscription storage stores the push subscription data,
   the network gateway sends a message that includes a proxy URL to the endpoint URL, and a push server at the endpoint URL respond to the message by sending a push message that includes the proxy URL to the user device.

9. The system of claim 8 further comprising a proxy configured to provide indirect proxied communications between the user device and the outside device.

10. The system of claim 9 wherein the indirect proxied communications are provided to the user device at the proxy URL.

11. The system of claim 8 further comprising a captive portal web page comprising the server public key, wherein the captive portal web page is provided to the user device before the proxy URL is provided to the user device.

12. The system of claim 8 wherein all communications through the network gateway by the user device are blocked until after the network gateway receives the push subscription data.

13. The system of claim 8 wherein all communications through the network gateway by the user device are blocked, excepting push service communications, until after the network gateway receives the push subscription data.

14. The system of claim 8 wherein the message further comprises authentication data generated at least in part using the server private key.

15. A non-transitory computer readable medium storing computer readable instructions, that when executed on one or more processors, implements a method comprising:
 providing gateway services to a user device wherein a plurality of security policies is enforced to restrict communication with the user device;
 detecting an encrypted direct communication attempt between the user device and an outside device;
 blocking the encrypted direct communication attempt in compliance with the plurality of security policies;
 providing indirect proxied communications between the user device and the outside device, wherein the user device communicates with a proxy, and wherein the proxy conducts encrypted proxy communications with the outside device;
 enforcing at least one of the plurality of security policies at the proxy, the proxy having unencrypted access to user device communications with the outside device;
 providing a server public key to the user device;
 receiving, from the user device, push subscription data that includes an endpoint uniform resource locator (URL) provided to the user device by a push service in response to a push subscription request that includes the server public key; and
 sending a message that includes a proxy URL to the endpoint URL.

16. The system of claim 8, wherein the network gateway includes the push subscription storage.

17. The system of claim 8 wherein the network gateway is a security appliance deployed in a path of network traffic between the user device and an outside network.

18. The non-transitory computer readable medium storing computer readable instructions of claim 15, the method further comprising:
 providing a captive portal web page to the user device before sending the message to the endpoint URL, the captive portal web page comprising the server public key.

19. The non-transitory computer readable medium storing computer readable instructions of claim 15, wherein the message further comprises authentication data generated at least in part using a server private key that is in a server key pair with the server public key.

20. The non-transitory computer readable medium storing computer readable instructions of claim 15, the method further comprising:
 receiving a push message from a push server at the endpoint URL;
 determining that the plurality of security policies approve providing the push message to the user device; and
 providing the push message to the user device in compliance with the plurality of security policies,
 wherein the push server sends the push message in response to receiving the message.

\* \* \* \* \*